May 31, 1966   F. G. DE ROO   3,253,519
PRESSURE OPERATED WELDER HEAD
Filed Feb. 20, 1964
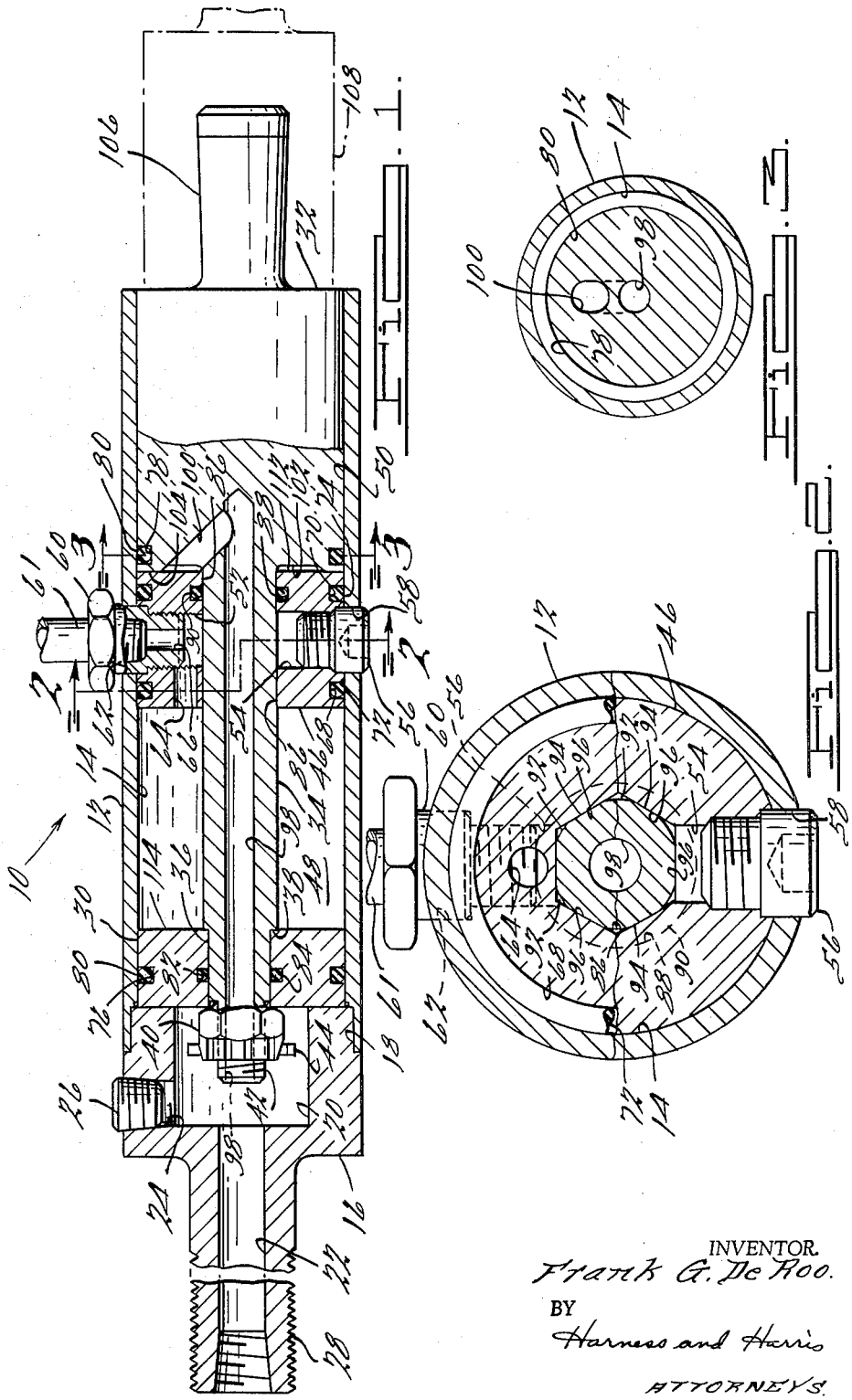
INVENTOR.
Frank G. De Roo.
BY
Harness and Harris
ATTORNEYS

United States Patent Office 3,253,519
Patented May 31, 1966

3,253,519
PRESSURE OPERATED WELDER HEAD
Frank G. De Roo, Detroit, Mich., assignor to Chrysler Corporation, Highland Park, Mich., a corporation of Delaware
Filed Feb. 20, 1964, Ser. No. 346,207
5 Claims. (Cl. 92—110)

This invention relates generally to welding and more particularly to a pressure operated welding head or cylinder assembly employed within a welding apparatus for actuating a welding electrode.

It is an object of this invention to provide a novel and improved welding head or cylinder assembly comprised of elements of such relative proportions as to increase the useful life of such a cylinder assembly as compared to a cylinder assembly constructed in accordance with the prior art.

It is a further object of this invention to provide a novel and improved welding head or cylinder assembly comprised of elements arranged so as to enable the rapid replacement of any of said elements.

Other objects and advantages of this invention will become apparent when reference is made to the following description and accompanying drawings wherein:

FIGURE 1 is a longitudinal cross-sectional view of a welding gun actuating cylinder assembly constructed in accordance with the teachings of this invention;

FIGURE 2 is an enlarged cross-sectional view taken substantially on the plane of line 2—2 of FIGURE 1 and looking in the direction of the arrows; and FIGURE 3 is a cross-sectional view taken substantially on the plane of line 3—3 and looking in the direction of the arrows.

Referring now in greater detail to the drawings, FIGURE 1 illustrates the actuating cylinder assembly 10 as being comprised of a body 12 in the form of a cylinder provided with a bore 14 of substantially constant diameter therethrough. One end of cylinder 12 is generally closed as by a fitting 16 which may be received in a counterbore 18 formed in body 12 and secured therein as by welding. Fitting 16 has a recess 20 formed therein which communicates with passages 22 and 24 respectively formed axially and radially of fitting 16. Each of passages 22 and 24 are provided with internally threaded portions for the reception therein of cooperating conduits. Passage 24 is illustrated as containing a threaded plug member 26. An externally threaded portion 28 is provided for threaded engagement with a suitable holder (not shown).

Within bore 14 are arranged pistons 30 and 32 of which piston 32 has an axially extending piston rod 34 formed integrally therewith. Piston 30 is situated on a reduced portion 36 of piston rod 34 and held against a shoulder 38 by a nut 40 threadably engaged with a threaded end portion 42 of piston rod 34. Preferably nut 40 is of the castle variety so as to accommodate a key member 44 passing through end portion 42.

A wall member 46 received with bore 14 serves to generally divide the bore 14 into two variable chambers 48 and 50 respectively containing pistons 30 and 32. Wall 46 has formed therein radially directed passages 52 and 54 each of which is provided with an internally threaded portion. A combination locating and retainer member 56 is closely received through an aperture 58 in body 12 and threadably engaged with the threaded portion of passage 54. Similarly, a fitting 60, adapted to receive a conduit 61, is closely received through an aperture 62 and threadably engaged with the threaded portion of passage 52. A conduit 64 formed in wall 46 completes communication between passage 52 and chamber 48 while conduit 66 completes communication between passage 52 and conduit 61. The provision of retainer member 56 and fitting 60 passing through cooperating apertures formed in the wall of body 12 effectively precludes undesirable movement of wall 46 both axially and angularly with respect to body 12.

Annular grooves 68 and 70, formed circumferentially about wall 46 and axially spaced so as to be on either sides of passages 52 and 54, respectively contain seals 72 and 74. Similarly, pistons 30 and 32 are respectively provided with circumferential annular grooves 76 and 78 which receive seals 80 so as to maintain sealing engagement with bore 14 even while relative axial motion is experienced therebetween. Preferably, piston 30 has formed therein a generally internal groove 82 which contains an annular seal 84.

As best seen in FIGURE 2, an axially extending passageway 86 of hexagonal cross-section is formed through wall 46. An annular groove 88 formed generally within wall 46 contains an annular seal 90 which resiliently engages the peripheral surface of piston rod 34 as it moves axially relative to wall 46. Piston rod 34 is of hexagonal cross section closely approximating the size of the hexagonal passageway 86 and still permitting for sliding motion therebetween. In order to prolong the life of seal 90, the respective apexes of the cross sectional hexagon of rod 34 are nubbed or rounded off as at 92 so as to eliminate the sharpness thereof while still preserving relatively large flattened side portions 94 for engagement with the wall surfaces 96 of passageway or keyway 86.

Piston rod 34 is also provided with an axially extending conduit 98 which communicates at one end with a generally radially directed conduit portion 100 which breaks out into an annular groove 102 formed in the face 104 of piston 32.

The extreme outer end of piston 32 is provided with a tapered shank portion 106 which may be employed for securing an appropriate welding electrode 108 thereto.

Depending on the type of welding gun, an air supply conduit may be connected to either passage 24 or 22. However, as illustrated in FIGURE 1, a plug 26 is provided in conduit 24 and therefore the supply conduit would be connected with conduit 22. A second air supply conduit, illustrated by conduit 61, is connected to conduits 52 and 64. Both of the air supply conduits are connected to suitable valving means (not shown) which can be manually operated so that when air under pressure is admitted through conduit 22, conduit 61 becomes vented to an area of relatively low pressure as, for example, the ambient atmosphere and vice versa.

As air under pressure is admitted through conduit 22, it passes into recess 20 where it reacts against surface 110 of piston 30 and, at the same time, flows through conduits 98 and 100 into annulus 102 where it reacts against face 104 of piston 32 and face 112 of wall 46. Consequently, pistons 30 and 32 are caused to move to the right moving the member 108 to its appropriate working position. During this time, conduit 61 is of course in communication with an area of relatively low pressure thereby enabling any fluid within chamber 48 to the right of piston 30 to be expelled through conduits 64 and 66.

After the work portion of the cycle is completed, conduit 22 is vented to an area of relatively low pressure and conduit 61 is made the supply conduit for air under pressure. During this time any air contained between faces 104 and 112 of piston 32 and wall 46, respectively, and any air contained to the left of piston 30 is expelled through conduit 22 by the action of relatively high pressure air being directed into chamber 48 and reacting against face 114 of piston 30.

The invention as herein disclosed provides important advantages over the prior art. For example, the prior art has attempted to provide wall means within the cylinder body in order to separate the body into two working chambers. This has been accomplished in the prior art, an example of which is United States Patent 2,661,599 issued to F. F. Folmer, by providing a sleeve like member the sleeve extension of which receives one of the piston members. In order to achieve substantially uniform diameters of both pistons a portion of the bore of the cylindrical body had to be enlarged in order to accommodate the sleeve extension which in turn received one of the pistons. The invention as herein disclosed requires no such sleeve members.

Further, the prior art has also attempted to provide means for preventing rotation of the outer piston 32 in order to preclude rotation of the electrode 108. As shown in said United States Patent 2,661,599, the prior art has sought to achieve this by providing a pair of parallel flattened surfaces formed oppositely to each other on the outer piston so as to cooperate with a guide bushing secured at the extreme end of the cylindrical bore. However, in order to secure the guide bushing to the cylindrical body, locking pins or similar members had to be passed through both the cylindrical body and the bushing. Consequently, in order to avoid interference the outer piston had to have a stepped diameter, of reduced dimension, which would be piloted in the guide bushing.

A reduction in size of the piloted diameter of the outer piston has resulted in loss of lateral stability often required during welding operations wherein side thrusts or loading forces are incurred. Further, the guide bushing of the prior art was required to perform a second function, that being keeping the sleeve member locked against axial movement relative to the cylindrical body.

In view of the above it is obvious that the prior art structures are relatively difficult and costly to manufacture and that the wear incurred therein is substantially greater as compared to a cylinder assembly of equal size and constructed in accordance with this invention. Further, it can be appreciated that in the prior art constructions it often becomes a problem to achieve the proper concentricity and/or alignment as between the cylinder bore, the enlarged cylinder bore, the outer diameter of the inner piston, the inner diameter of the inner piston, the outer diameter of the piston rod, the inner diameter of sleeve receiving the piston rod, the outer diameter of the sleeve, the inner diameter of the sleeve, the outer diameter of the outer piston, the reduced diameter of the outer piston, the inner arcuate portions of the guide bushing receiving the reduced diameter of the outer piston and the outer diameter of the guide bushing.

The invention as herein disclosed provides a bore 14 of substantially uniform diameter thereby immediately eliminating a number of eccentricity problems as present in the prior art. Further, the invention does not require any costly elements such as the sleeve members of the prior art. Additionally, the invention, while providing novel and improved key means, as comprised by the passageway 86 and cooperating piston rod 34, for preventing rotation of the outer piston 32, also eliminates the necessity of a guide bushing as required by the prior art. As a direct consequence, the diameter of outer piston 32 is made uniform and of a size to take maximum advantage of the space provided by bore 14. Accordingly, the larger diameter of piston 32 and the uniformity thereof result in a piston which exhibits a high degree of stability and one which can withstand relatively high side loadings as often incurred during welding operations.

Although only one preferred embodiment of the invention has been disclosed and described, it is apparent that other embodiments and modifications of the invention are possible within the scope of the appended claims.

I claim:

1. A pressure operated cylinder assembly comprising a body, a bore of substantially uniform diameter formed through said body; a fitting secured to said body and generally closing one end of said bore, a wall member received in said bore and forming a transverse wall in said bore which divides said bore generally into first and second bore sections, said first bore section being generally between said fitting and one axial end surface of said transverse wall, said second bore section being defined at one end by another axial end surface of said transverse wall and terminating in an open end of a diameter determined by said second bore section, a first piston received in said first bore section and a second piston received in said second bore section, said second piston having a substantially uniform diameter throughout its entire axial length and having a length approximating the length of said second bore section, a piston rod extending through said transverse wall and connecting said pistons to each other, and an aperture formed through said transverse wall for receiving said rod therethrough, said piston rod and said aperture each having a cross-section which results in said piston rod and said aperture being keyed to each other so as to permit substantially only relative axial movement therebetween.

2. A pressure operated cylinder assembly comprising a body, a bore of substantially uniform diameter formed through said body, a fitting secured to said body and generally closing one end of said bore, a generally cylindrical wall member received within said bore intermediate the ends thereof and forming a generally transverse wall within said bore dividing said bore into first and second bore sections, said first bore section being defined generally at one axial end by said fitting and at the other axial end by an axial end surface of said transverse wall, said second bore section being defined at one end by another axial end surface of said transverse wall and extending axially and terminating in an open end of said bore, said open end being of a diameter determined by said bore, a first piston slidably received within said first bore, a second piston slidably received within said second bore section, said second piston having a substantially uniform outer diameter closely received within the cylindrical surface of said second bore section, the axial length of the outer diameter of said second piston approximating the axial length of said second bore section, said transverse wall member having first and second axially spaced annular grooves formed in the outer peripheral surface respectively containing first and second sealing members each held in sealing engagement with said bore, a first conduit portion in said transverse wall generally radially thereof and located axially so as to be between said first and second sealing members, and axially extending keyway formed through said transverse wall, a piston rod carried at one end by said second piston axially slidably received through said keyway so as to have its other end generally within said first bore section, said piston rod having at least one surface formed over a substantial portion of its axial length adapted to engage said keyway in order to preclude undesirable rotation of said piston rod and second piston relative to said transverse wall, a first aperture formed through said first piston axially thereof adapted to receive therethrough said other end of said piston rod, an externally threaded portion formed on said piston rod near said other end, a nut member threadably engaging said threaded portion in order to retain said first piston on said piston rod, first conduit means formed in said second piston and said piston rod having one end communicating with said second bore section and having another end opening in said other end of said piston rod, a second conduit portion formed in said transverse wall and communicating with said first bore section and said first conduit portion, second conduit means threadably engaging said first conduit portion for at times supplying thereto actuating fluid under relatively high pressure, said first conduit means being effective at times to transmit actuating fluid from said fitting to said second bore section, and a locking member closely received within a second aperture formed radially through said body and threadably engaged within said transverse wall member intermediate said first and second sealing members in order to preclude both undesirable rotational and axial movement of said transverse wall member with respect to said body.

3. A pressure operated cylinder assembly comprising a body having a generally cylindrical bore formed therein, said bore terminating in a generally closed end near one end of said body and terminating in an open end in an other end of said body, a wall member received in said bore and forming a transverse wall in said bore which divides said bore generally into first and second bore sections, said first bore section being generally between said fitting and one axial end surface of said transverse wall, said second bore section being defined at one end by another axial end surface of said transverse wall and terminating in an open end of a diameter determined by said second bore section, a first piston received in said first bore section and a second piston received in said second bore section, said second piston having a substantially uniform diameter throughout its entire axial length and having a length approximating the length of said second bore section, a piston rod extending through said transverse wall and connecting said pistons to each other, and an aperture formed through said transverse wall for receiving said rod therethrough, said piston rod and said aperture each having a cross-section which results in said piston rod and said aperture being keyed to each other so as to permit substantially only relative axial movement therebetween.

4. A pressure operated cylinder assembly comprising a body having a generally cylindrical bore formed therein, said bore terminating in a generally closed end near one end of said body and terminating in an open end in an other end of said body, a wall member received in said bore and forming a transverse wall in said bore which divides said bore generally into first and second bore sections, said first bore section being generally between said closed end and one axial end surface of said transverse wall, said second bore section being defined at one end of by another axial end surface of said transverse wall and terminating in said open end, a first piston received in said first bore section and a second piston received in said second bore section, said second piston having a substantially uniform diameter throughout its entire axial length and having a length substantially greater than the axial length of said first piston and equal to at least a major portion of the axial length of said second bore section, a piston rod extending through said transverse wall and connecting said pistons to each other, and an aperture formed through said transverse wall for receiving said rod therethrough, said piston rod and said aperture each having a cross-section which results in said piston rod and said aperture being keyed to each other so as to permit substantially only relative axial movement therebetween.

5. A pressure operated cylinder assembly comprising a body having a generally cylindrical bore formed therein, said bore terminating in a generally closed end near one end of said body and terminating in an open end in an other end of said body, a wall member received in said bore and forming a transverse wall in said bore which divides said bore generally into first and second bore sections, said first bore section being generally between said closed end and one axial end surface of said transverse wall, said second bore section being defined at one end by another axial end surface of said transverse wall and terminating in said open end, a first piston of relatively short axial length received in said first bore section and a second piston of relatively long axial length received in said second bore section, said second piston having a length substantially greater than the axial length of said first piston and equal to at least a major portion of the axial length of said second bore section, a piston rod extending through said transverse wall and connecting said pistons to each other, and an aperture formed through said transverse wall for receiving said rod therethrough, said piston rod and said aperture each having a cross-section which results in said piston rod and said aperture being keyed to each other so as to permit substantially only relative axial movement therebetween.

References Cited by the Examiner
UNITED STATES PATENTS

| 486,095 | 11/1892 | Elmes | 91—4 |
|---|---|---|---|
| 825,866 | 7/1906 | Rogers | 92—110 |
| 1,917,671 | 7/1933 | Stahl | 92—151 |
| 2,552,549 | 5/1951 | Good | 92—165 |
| 2,714,331 | 8/1955 | Plante | 92—110 |
| 2,983,256 | 5/1961 | Seeloff | 92—151 |
| 3,000,357 | 9/1961 | Geyer | 92—151 |
| 3,187,730 | 6/1965 | White | 92—151 |

SAMUEL LEVINE, *Primary Examiner.*

RICHARD B. WILKINSON, *Examiner.*

H. G. SHIELDS, *Assistant Examiner.*